United States Patent [19]
Olshansky

[11] 4,163,601
[45] Aug. 7, 1979

[54] MULTIMODE WAVEGUIDE WITH ENHANCED COUPLING WITH GUIDED MODES

[75] Inventor: Robert Olshansky, Addison, N.Y.
[73] Assignee: Corning Glass Works, Corning, N.Y.
[21] Appl. No.: 824,154
[22] Filed: Aug. 12, 1977
[51] Int. Cl.² .............................................. G02B 5/14
[52] U.S. Cl. .................... 350/96.31; 65/3 A; 350/96.30
[58] Field of Search .............. 350/96.29, 96.30, 96.31; 65/3 R, 3 A

[56] References Cited

U.S. PATENT DOCUMENTS

| | | | |
|---|---|---|---|
| 3,666,348 | 5/1972 | Marcatili | 350/96.15 |
| 3,687,514 | 8/1972 | Miller et al. | 350/96.15 |
| 3,723,921 | 3/1973 | Rowe et al. | 350/96.30 X |
| 3,909,110 | 9/1975 | Marcuse | 350/96.31 X |
| 3,912,478 | 10/1975 | Presby | 65/2 |

Primary Examiner—John K. Corbin
Assistant Examiner—John D. Lee
Attorney, Agent, or Firm—Walter S. Zebrowski; Richard E. Kurtz; Clarence R. Patty, Jr.

[57] ABSTRACT

In a multimode optical waveguide, coupling is promoted among guided modes while coupling to unguided modes is suppressed. The core includes perturbations having a power spectrum which decreases with increasing mode order and which has a plurality of minima. The length of each perturbation is such that a minimum in the power spectrum of the perturbation occurs at the critical frequency $\omega_c$ and the power spectrum is significantly reduced for high frequencies.

8 Claims, 8 Drawing Figures

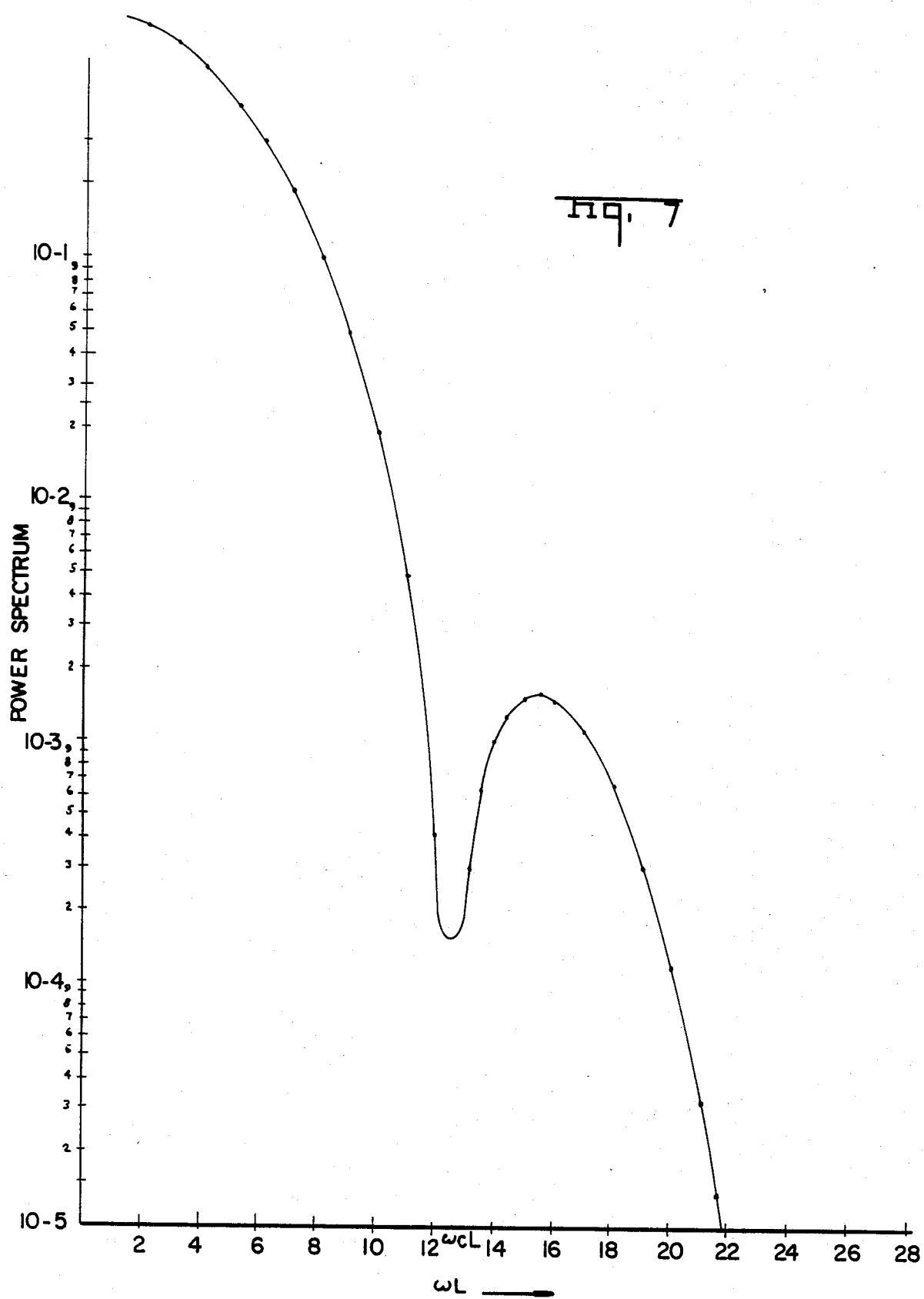

MULTIMODE WAVEGUIDE WITH ENHANCED COUPLING WITH GUIDED MODES

BACKGROUND OF THE INVENTION

This invention relates to multimode waveguides and methods of fabricating them.

An optical pulse launched into a multimode optical waveguide excites many modes, each traveling at a different group velocity. Such waveguides suffer from multimode dispersion. At the far end of the waveguide, the pulse is spread out in time by an amount that is proportional to the length of the waveguide because of the different group velocities of the modes. Such multimode dispersion can severely limit the information-carrying capacity of the waveguide.

It is known that multimode dispersion in optical waveguides can be reduced by deliberately enhancing coupling among the various modes in the waveguide. In accordance with the teachings of U.S. Pat. Nos. 3,666,348 Marcatili, 3,687,514 Miller and 3,912,478 Presby, mode coupling can be produced by causing variations in such waveguide parameters as core radius, core refractive index and waveguide axis. Since the optical power carried in the waveguide transfers back and forth between slow and fast modes, averaging takes place, so that the propagating light pulse travels at an average group delay, with a resultant reduction in pulse broadening. In the presence of such mode coupling the pulse width increases only as the square root of the waveguide length.

Coupling optical power among the guided modes of a multimode optical waveguide can significantly reduce the dispersion caused by intermodal delay differences. Perturbations cause coupling among the guided modes and will, in general, also cause coupling from the guided to the unguided modes. The latter type of power transfer is undesirable since it reduces the strength of the transmitted signal.

Coupling induced losses are determined by the strength of the coupling among the higher order modes, whereas the reduction in pulse dispersion is determined by the average strength of the coupling among the guided modes. For a given loss penalty the benefit in decreased pulse broadening improved if the average coupling strength can be made higher relative to the coupling strength which governs the losses. For example in the aforementioned U.S. Pat. No. 3,666,348 Marcatili the coupling is restricted to selected pairs of guided modes by controlling the spatial periodicity of the coupling mechanism. In particular, the spatial periodicity is made equal to the beat wavelength for the two modes.

The perturbations which cause mode coupling take many forms. For example, small bubbles at the core-cladding interface, bends in the waveguide, and variations in the diameter of the guide are all perturbations which have been shown to cause mode coupling. Mode coupling theory shows that the coupling between two modes is proportional to the power spectrum of the perturbation. Perturbations of random lengths promote coupling between all modes, guided and unguided. FIGS. 2 and 3 of the Miller et al patent show methods of making waveguides with random perturbations in response to a source of noise. However, it is desired to produce perturbations having a power spectrum which is high for the guided modes. In order to do this, the Miller et al patent shows, in FIG. 5, a technique of band pass filtering the noise source before using the noise to cause perturbations in the waveguide fabrication process. The theory is that such a process will cause perturbations having a spatial periodicity equal to the beat wavelength between the modes to be coupled. Theoretically, such a technique would produce perturbations promoting coupling only between the guided modes with no power coupling to the unguided modes. However, in practice, the fabrication technique shown in FIG. 5 of the Miller et al patent is difficult to carry out.

SUMMARY OF THE INVENTION

In accordance with this invention, optical waveguides have perturbations which promote power coupling to the guided modes, which promote relatively weak power coupling to the unguided modes, and which are of sufficiently simple geometry to permit easy fabrication.

Further in accordance with the invention, each of the perturbations has a length such that a minima in the power spectrum occurs at the critical frequency.

Further in accordance with the invention, the waveguides are easily fabricated by controlling the drawing operation so that the length of the waveguide is related to the diameter of the core, the indices of refraction of the core and cladding, and the shape of the perturbation so that the first zero in the power spectrum of the perturbation occurs at the critical frequency.

The foregoing and other objects, features and advantages of the invention will be better understood from the following more detailed description and appended claims.

DESCRIPTION OF THE DRAWINGS

FIG. 5 shows the idealized power spectrum of a waveguide in which an attempt is made to match the spatial periodicity of the pertubations to the beat wavelength of the modes to be coupled as in the aforementioned Miller et al patent;

DETAILED DESCRIPTION OF THE INVENTION

Figure 1:
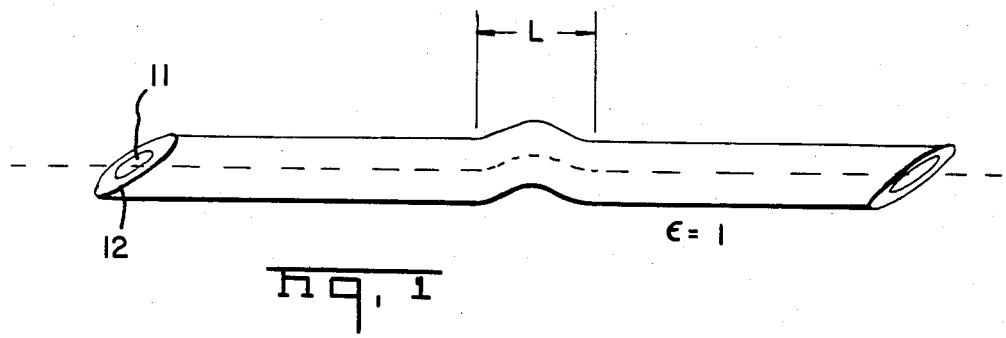
FIG. 1 shows a waveguide with a bend type perturbation.
Figure 2:
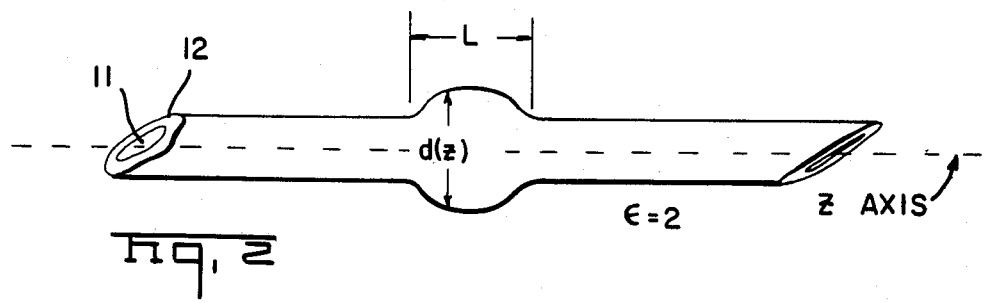
FIG. 2 shows a waveguide with a diameter type perturbation.

FIGS. 1 and 2 show optical waveguides including a glass core 11 and a glass cladding 12 around the core.

The core has a higher index of refraction than the cladding. Light travels along the optical waveguide in modes of propagation, each having a propagation constant $\beta$.

The waveguides have perturbations which promote power coupling between the modes of propagation. FIG. 1 shows a band type perturbation and FIG. 2 shows a diameter type perturbation. The present invention is applicable to other types of perturbations having particular properties and having a length L related to the diameter of the core and the indices of refraction of the core and cladding such that the first minima in the power spectrum of the perturbation occurs at the critical frequency.

In general, the perturbations can be described by a function f(z) which indicates the departure of the perturbation from the unperturbed waveguide, as a function of the position z along the axis. In the case of bend-type perturbations, f(z) measures the displacement of the waveguide center from the unperturbed position. In the case of diameter variations it measures the departure of the diameter, $d(z) = d_o[1 + f(z)]$, from the unperturbed diameter $d_o$.

In accordance with the present invention, the perturbations have particular properties which are easily fabricated and the perturbations have a length which promotes coupling between guided modes with relatively small power coupling to the unguided modes. First, consider the class of perturbations which have the following properties:

(a) The perturbation is non-zero only over a segment of length L, $$f_o(z) \neq o \text{ only for } -L/2 < z < L/2.$$

(b) The perturbation joins smoothly to the unperturbed waveguide at $$|z| = L/2,$$

$$f(\pm L/2) = o.$$

(c) The perturbation is approximately symmetric, $$|f(z) + f(-z)| >> |f(z) - f(-z)|$$

(d) The perturbation increases (or decreases) monotonically from the end points to a point of maximum (or minimum) deviation at $z \approx o$.

$$f(z) \gtreqless o \text{ (or } f(z) \lesseqgtr o) \text{ for } z \gtreqless o \text{ and } f(o) = a.$$

(e) The change of curvature is smooth and there is only one inflection point on either side of z=0.

Perturbations which have the foregoing properties have a power spectrum which decreases with increasing mode order and which has a plurality of minima. In accordance with this invention, the length of each perturbation is such that the first minima in the power spectrum of the perturbation occurs at the critical frequency $\omega_c$. This promotes coupling to guided moles and there is relatively little coupling to the unguided modes.

A better understanding of the invention may be had from the following description of the background theory and the reasons why the present invention promotes coupling only to the guided modes. By well known electromagnetic wave theory, the modes of light propagations are described by:

$$E_i(x, y, z) = E_i(x, y, z) e^{j\beta_i z} \quad (1)$$

where $E_i(x, y, z)$ is a function describing the amplitude of the wave traveling in the $i^{th}$ mode in terms of the x, y, z coordinates of the waveguide, $\beta_i$ is the phase constant for that mode and e is the Napierian logarithm base.

Figure 3:
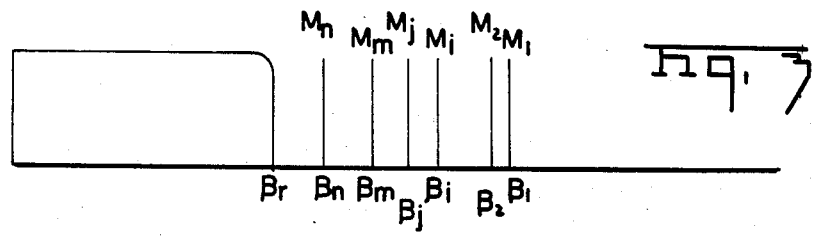
FIG. 3 depicts the mode distribution as a function of phase constant $\beta$ in a multimode optical waveguide.

FIG. 3 shows a typical distribution of mode groups in a multimode optical waveguide as a function of phase constant. There is a distribution of discrete guided modes $M_1, M_2 \ldots M_i, M_j, M_n$ having phase constant $\beta_1, \beta_2, \beta_i, \beta_j \ldots \beta_n$ respectively. In addition, there is a continuance of unguided or radiation modes starting at phase constant $\beta_r$. The difference between the phase constants of the highest order mode for which coupling is desired, and the next highest order mode is designated $\omega_c$. In FIG. 3, $\omega_c = \beta_n - \beta_m$.

The introduction of perturbations couples power among the various modes. Mode coupling theory shows that the coupling between mode i and mode j which have propagation constants $\beta_i$ and $\beta_j$ respectively is proportional to the power spectrum P ($\omega_{ij}$) of the perturbation defined below. If the perturbation is described by a function f(z) which indicates the departure of the perturbation from the unperturbed waveguide, then the power spectrum is given by $$P(\omega_{ij}) = N < | \int_{-L/2}^{L/2} dz f_o(z) e^{i\omega_{ij} z}|^2 > \quad (2)$$

where N is the number of perturbations spatially separated from each other, L is the length of the perturbation, $\omega_{ij}$ is the difference in phase constants between two coupled modes and the remaining terms have been previously defined.

Figure 4:
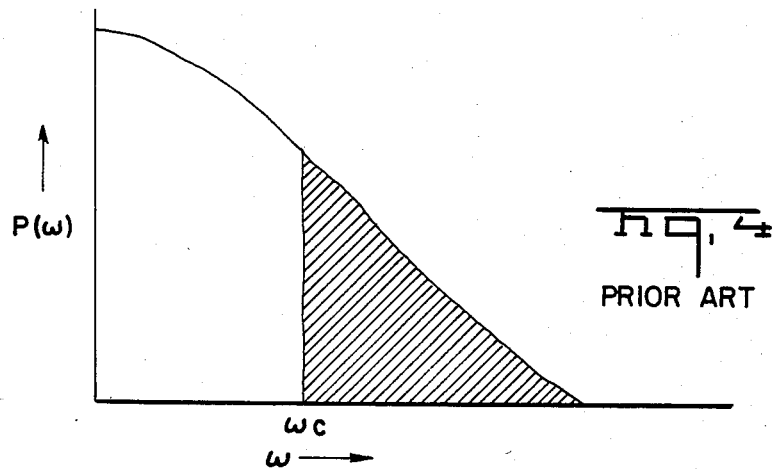
FIG. 4 shows the power spectrum of a prior art waveguide with random perturbations.

If the perturbations are of random lengths, then the power spectrum of the perturbations is as shown in FIG. 4. There is coupling to the guided modes as indicated by the portion of the curve to the left of $\omega_c$. However, there is also significant coupling to the unguided modes as indicated by the shaded portion of the curve.

The aforementioned Miller et al patent describes an attempt to introduce perturbations of different lengths which will couple among the guided modes. Specifically, the Miller et al patent suggests that the spatial wavelengths of the perturbations be $$\lambda_{12} = \frac{2\pi}{\beta_1 - \beta_2} = \frac{2\pi}{\omega_1}$$

$$\lambda_{13} = \frac{2\pi}{\beta_1 - \beta_3} = \frac{2\pi}{\omega_2}$$

$$\lambda_{14} = \frac{2\pi}{\beta_1 - \beta_4} = \frac{2\pi}{\omega_3}$$

$$\lambda_{23} = \frac{2\pi}{\beta_2 - \beta_3} = \frac{2\pi}{\omega_4}$$

$$\lambda_{24} = \frac{2\pi}{\beta_2 - \beta_4} = \frac{2\pi}{\omega_5}$$

$$\lambda_{34} = \frac{2\pi}{\beta_3 - \beta_4} = \frac{2\pi}{\omega_6}$$

The power spectrum of the perturbations having lengths corresponding with $\lambda_{12} = 2\pi/\omega_1$ and $\lambda_{13} = 2\pi/\omega_2$ are shown in FIG. 5. The power spectrum is sharply peaked at the frequency of each perturbation. Such perturbations promote coupling only between modes 1 and 2 and between modes 1 and 3 and do not promote coupling to the unguided modes. By introducing perturbations having lengths related to the differences in phase constants of the modes to be coupled, Miller et al promote coupling only between these modes. However, it is difficult to fabricate waveguides with such perturbations.

In accordance with the present invention, the perturbations all have the same length. The length is selected such that the power spectrum of the perturbation has a plurality of minima, the first of which occurs at the critical frequency $\omega_c$.

Figure 6:
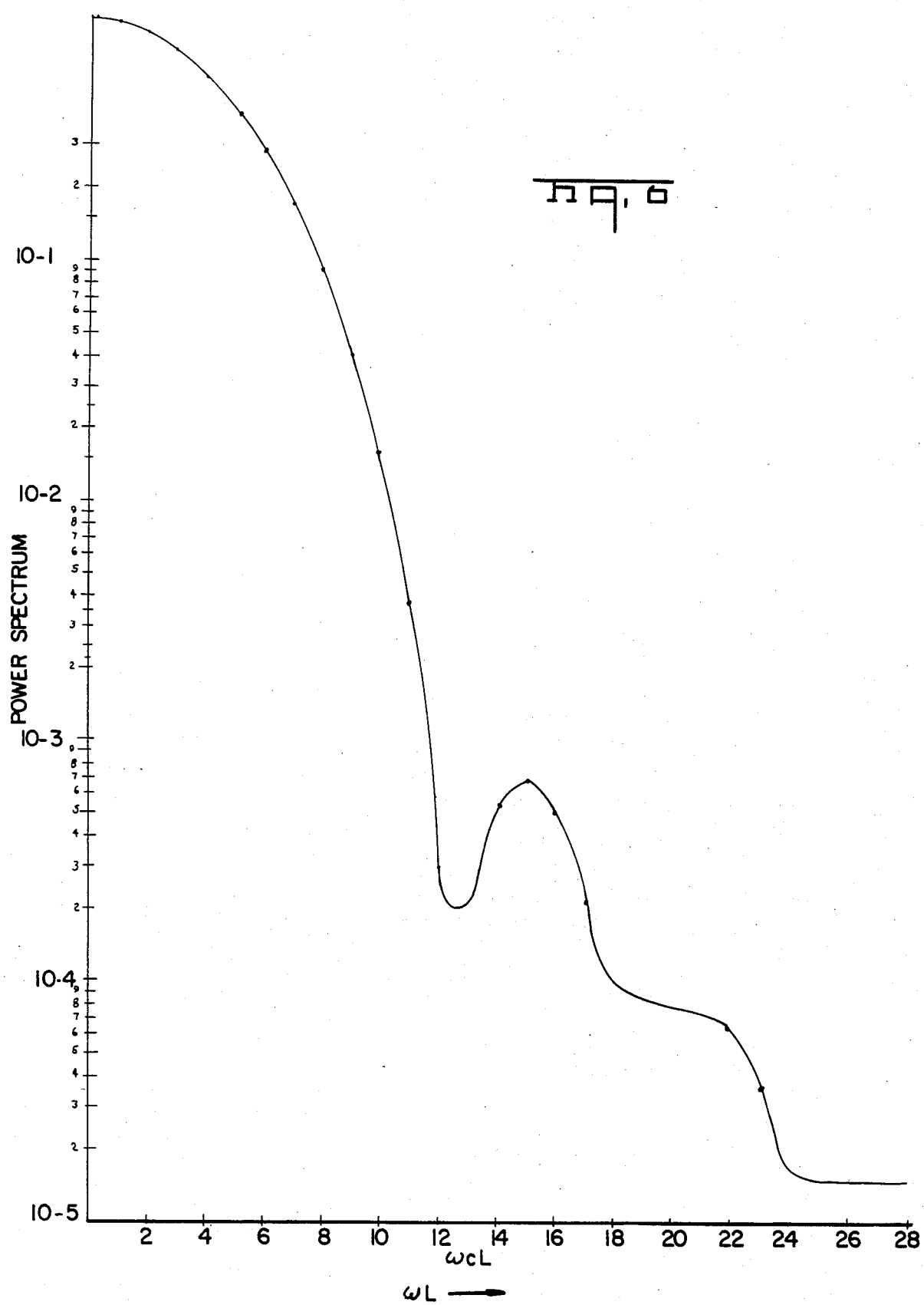
FIG. 6 shows the power spectrum of one example of the present invention.

FIG. 6 shows the power spectrum of one embodiment of the invention. It can be seen that the first minima in the power spectrum occurs approximately at the frequency $4\pi/L$. The portion of the power spectrum to the left of this minima promotes power coupling to the guided modes. There is some coupling to unguided modes as indicated by the portion of the power spectrum to the right of the minima at $4\pi/L$. However, the peak of the first lobe is three orders of magnitude down from the peak of the main lobe. Therefore, the coupling to unguided modes is significantly less than the coupling to guided modes.

EXAMPLES

One class of perturbation which has the foregoing properties (a)-(e) are index profile waveguides where the index of refraction as a function of radius is given by $$n^2(r) = n^2_1 [1 - 2\Delta(r/a)^\alpha] \text{ for } r \leq a \qquad (3)$$
$$n^2(r) = n^2_1 [1 - 2\Delta] \text{ for } r \geq a,$$

where r is the radius of the waveguide, n(r) is the index of refraction at a given radius r, $n_1$ is the index of refraction at the axis of the core, $n_2$ is the index of refraction of the cladding, $\Delta$ is $(n_1^2 - n_2^2)/2n_1^2$, a is the diameter of the core and $\alpha$ is a gradient coefficient specifying the gradient in the index of refraction.

The present invention is applicable to waveguides having different values of $\alpha$ including step index guides wherein $\alpha = \infty$. The invention is also applicable to parabolic pedestal index guides as described in my co-pending application Ser. No. 725,172, filed Sept. 21, 1976.

In such waveguides, it can be shown that the difference in propagation constants between two modes $$\Delta\beta(m) = \epsilon \frac{2\sqrt{\Delta}}{a} ( \frac{\alpha}{\alpha + 2} )^{\frac{1}{2}} ( \frac{m}{M} )^{\alpha - 2/\alpha + 2} \qquad (4)$$

where $\epsilon = 1$ for bend-type perturbations and $\epsilon = 2$ for diameter perturbations. For other types of perturbations the value of $\epsilon$ can be determined from mode coupling theory.

Mode coupling losses will be reduced if the length L of the perturbation is chosen so that adjacent mode coupling vanishes at m=M. This occurs if the waveguide and the perturbations are designed so that the first minima of the Fourier transform occurs at the critical frequency $\omega_c = \Delta\beta(M)$. From equation (4) it is seen that this implies the condition $$\omega_c = \epsilon \frac{2\sqrt{\Delta}}{a} ( \frac{\alpha}{\alpha + 2} )^{\frac{1}{2}}. \qquad (5)$$

EXAMPLE 1

Consider the perturbation:

$$f(z) = \frac{1}{2}[1 + \cos(2\pi z/L)] - L/2 \leq z \leq L/2. \qquad (6)$$

The power spectrum is determined from equation (2), $$P_o(\omega) = \frac{1}{\omega^2} ( \frac{2\pi}{L} )^4 \frac{\sin^2(\omega L/2)}{[\omega^2 - (2\pi/L)^2]^2}. \qquad (7)$$

The minima of $P(\omega)$ occur at $\omega = 4\pi/L, 6\pi/L, 8\pi/L,$

Hence the perturbation length is chosen so that $$L = \frac{2\pi a}{\epsilon \sqrt{\Delta}} ( \frac{\alpha + 2}{\alpha} )^{\frac{1}{2}}. \qquad (8)$$

The power spectrum of such a waveguide is shown in FIG. 6. As a specific example of this type of waveguide, the following dimensions meet the requirements of this invention:
$\eta_1 = 1.47$,
$\Delta = 0.01$,
core radius $a = 30$ microns,
$\epsilon = 1$,
$\alpha = 10$, and a perturbation $L = 2.06$ mm.

EXAMPLE 2

Consider the perturbation:

$$\begin{array}{ll} f(z) = 1 - 8(z/L)^2 & |z| < L/4 \\ f(z) = 8/L^2 (|z| - L/2)^2 & L/4 < |z| < L/2. \end{array} \qquad (9)$$

Equations (9) imply that, $$\begin{array}{ll} f'(x) = -(4/L)^2 & |x| < L/4 \\ f'(x) = (4/L)^2 & L/4 < |x| < L/2. \end{array} \qquad (10)$$

The power spectrum of the function described by equation (9) is:

$$P(\omega) = (4/L)^4 \frac{64}{\omega^6} \sin^2(\omega L/4) \sin^4(\omega L/8). \qquad (11)$$

Minima occur at $\omega = 4\pi/L, 8\pi/L, 12\pi/L$

Figure 7:
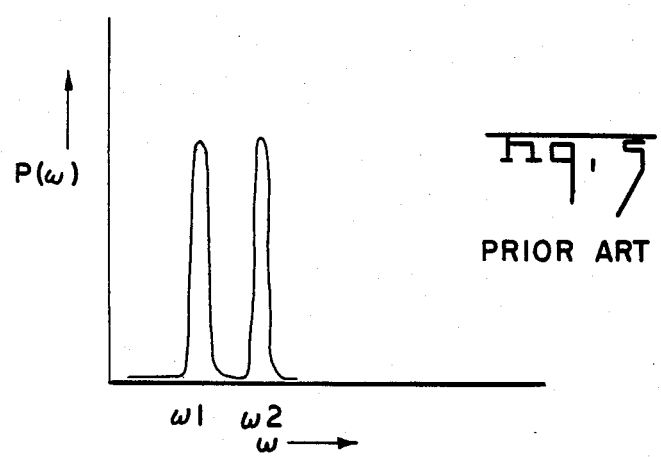
FIG. 7 shows the power spectrum of another example of the invention.

Therefore, the perturbation length is again given by (8). The power spectrum of this waveguide is shown in FIG. 7. As a specific example of this type waveguide, the following dimensions meet the requirements of this invention:
$\eta_1 = 1.47$,
$\Delta = 0.01$,
core radius $a = 30$ microns,
$\epsilon = 2$,
$\alpha = 4$, and perturbation length $L = 1.15$ mm.

Figure 8:
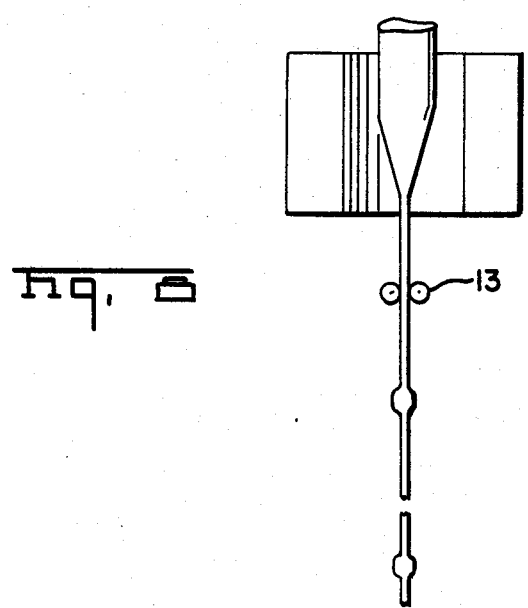
FIG. 8 depicts the method of making the waveguide of this invention.

Various techniques known to those skilled in the art may be employed to fabricate optical waveguides having both refractive index profiles and perturbations in accordance with this invention. A waveguide having a graded refractive index profile may be formed by the technique described in U.S. Pat. No. 3,823,955 issued to L. L. Carpenter on July 16, 1974. In this technique, a waveguide preform assembly is formed by applying a plurality of layers of material to a cylindrical mandrel by means of flame hydrolysis. A gas-vapor mixture is hydrolyzed within the flame of a burner to form a glass soot that leaves the flame in a stream which is directed toward and deposited on the mandrel. In the technique as conventionally employed, the mandrel is rotated and translated to provide a uniform deposition of soot. Changing the gas-vapor mixture within the flame changes the composition, and thus the refractive index, of the deposited layer. The mandrel is removed and the preform assembly so formed is heated, collapsed and drawn to reduce its cross-sectional area to form a waveguide having the desired index distribution. While the waveguide is being drawn, the speed of draw may be changed in order to introduce diameter variations. FIG. 8 depicts a draw operation in which the speed of draw is controlled by rollers 13. Assume a normal draw speed of in excess of one meter per second which is slowed down to one meter per second in order to introduce diameter perturbations at every one meter interval in the waveguide. In such a case, the rollers 13 are controlled to be slowed down to a draw speed of one meter per second for $2\times10^{-3}$ seconds at every one second interval. This produces a perturbation having a 2 millimeter length at every 1 meter interval. It has been found that the diameter of the perturbation should be large enough to couple, but otherwise as small as possible to avoid extruding problems.

While a particular embodiment of the invention has been shown and described, various modifications are within the true spirit and scope of the invention. The appended claims are intended to cover all such modifications.

What is claimed is:

1. An optical waveguide in which light travels along said waveguide in guided and unguided modes of propagation each having a propagation constant $\beta$, the difference between the propagation constants for the highest order guided mode to be coupled and the next higher order mode being the critical frequency $\omega_c$, said waveguide comprising:
   a glass core,
   a glass cladding around said core, said core having a higher index of refraction than said cladding, and perturbations spaced along the length of said core, each perturbation having a departure from the unperturbed waveguide which joints smoothly to the unperturbed waveguide at the ends of the perturbation, each perturbation being approximately symmetric and changing monotonically from the ends of the perturbation to a point of maximum or minimum deviation, the change being smooth with only one inflection point on either side of the middle of the perturbation, each perturbation having a power spectrum which decreases with increasing mode order and which has a plurality of minima, the length of each perturbation being such that the first minima in the power spectrum of the perturbation occurs at the critical frequency $\omega_c$ and the power spectrum at frequencies greater than $\omega_c$ has an amplitude greater than zero and at least two orders of magnitude below the peak amplitude of said power spectrum.

2. The waveguide recited in claim 1 wherein the waveguide has a gradient index of refraction in said core given by:

$$n^2(r) = n^2{}_1 [1 - 2\Delta(r/a)^\alpha] \text{ for } r \leq a$$
$$n^2(r) = n^2{}_1 [1 - 2\Delta] \text{ for } r \geq a,$$

where r is the radius of the waveguide, n(r) is the index of refraction at a given radius r, $n_1$ is the index of refraction at the axis of the core, $n_2$ is the index of refraction of the cladding, $\Delta = (n_1{}^2 - n_2{}^2)/2n_1{}^2$, a is the diameter of the core and $\alpha$ is a gradient coefficient specifying the gradient in the index of refraction, and wherein the length of the perturbation is:

$$L = \frac{2\pi a}{\epsilon \sqrt{\Delta}} \left(\frac{\alpha + 2}{\alpha}\right)^{\frac{1}{2}},$$

where $\epsilon$ is a coefficient specifying the type of perturbation.

3. The waveguide recited in claim 2 wherein each perturbation is of the type $$f(z) = \frac{1}{2}[1 + \cos(2\pi z/L)] \quad -L/2 \leq z \leq L/2$$

wherein the waveguide has a power spectrum which is given by:

$$P_c(\omega) = \frac{1}{\omega^2}\left(\frac{2\pi}{L}\right)^4 \frac{\sin^2(\omega L/2)}{[\omega^2 - (2\pi/L)^2]^2}$$

and which power spectrum has minima which occur at $$\omega = 4\pi/L, 6\pi/L, 8\pi/L, \ldots$$

where f(z) is a function which specifies the departure of the perturbation from the unperturbed waveguide as a function of the position z along the axis, L is the length of the perturbation, and $\omega$ designates the difference in phase contents between adjacent modes.

4. The waveguide recited in claim 2 wherein each perturbation is of the type $$f(z) = 1 - 8(z/L)^2 \quad |z| < L/4$$
$$f(z) = 8/L^2(|z| - L/2)^2 \quad L/4 < |z| < L/2$$

wherein the waveguide has a power spectrum which is given by:

$$P(\omega) = (4/L)^4 \frac{64}{\omega^6} \sin^2(\omega L/4) \sin^4(\omega L/8)$$

which power spectrum has minima which occur at $$\omega = 4\pi/L, 8\pi/L, 12\pi/L \ldots$$

where f(z) is a function which specifies the departure of the perturbation from the unperturbed waveguide as a function of the position z along the axis, L is the length of the perturbation, and $\omega$ designates the difference in phase constants between adjacent modes.

5. The waveguide recited in claim 2 wherein each perturbation is a bend type of perturbation where $\epsilon=1$.

6. The waveguide recited in claim 2 wherein each perturburation is a diameter perturbation where $\epsilon=2$.

7. A method of producing an optical waveguide comprising:
   providing a glass tube having a core with an index of refraction higher than the cladding thereof,
   heating the composite structure so formed to the drawing temperature of the materials thereof,
   drawing the heated composite structure to reduce the cross-sectional area thereof, and
   controlling the drawing operation to produce perturbations spaced along the length of said waveguide, the length of said perturbations being related to the controlled diameter of said core, to the indices of refraction of said glass, and shape of said perturbations such that the first minima in the power spectrum of the perturbation occurs at the critical frequency $\omega_c$ and the power spectrum at frequencies greater than $\omega_c$ has an amplitude greater than zero and at least two orders of magnitude below the peak amplitude of said power spectrum.

8. An optical waveguide in which light travels along said waveguide in guided and unguided modes of propagation each having a propagation constant $\beta$, the difference between the propagation constants for the highest order guided mode to be coupled and the next higher order being the critical frequency $\omega_c$, said waveguide comprising:
- a glass core,
- a glass cladding around said core, said core having a higher index of refraction than said cladding, and
- perturbations spaced along the length of said core, each perturbation having a departure from the unperturbed waveguide which joins smoothly to the unperturbed waveguide at the ends of the perturbation, each perturbation being approximately symmetric and changing monotonically from the ends of the perturbation to a point of maximum or minimum deviation, the change being smooth with only one inflection point on either side of the middle of the perturbation, each perturbation having a power spectrum which decreases with increasing mode order and which has a plurality of minima, the length of each perturbation being such that the first minima in the power spectrum of the perturbation occurs at the critical frequency $\omega_c$, and the power spectrum has a finite amplitude at frequencies greater than $\omega_c$, said waveguide having a gradient index of refraction in said core given by:

$$n^2(r) = n^2_1 [1 - 2\Delta(r/a)^\alpha] \text{ for } r \leq a$$
$$n^2(r) = n^2_1 [1 - 2\Delta] \text{ for } r \geq a,$$

where r is the radius of the waveguide, n(r) is the index of refraction at a given radius r, $n_1$ is the index of refraction at the axis of the core, $n_2$ is the index of refraction of the cladding, $\Delta$ is $(n_1^2-n_2^2)/2n_1^2$, a is the diameter of the core and $\alpha$ is a gradient coefficient specifying the gradient in the index of refraction, and wherein the length of the perturbation is:

$$L = \frac{2\pi a}{\epsilon/\Delta} ( \frac{\alpha + 2}{\alpha} )^{\frac{1}{2}},$$

where $\epsilon$ is a coefficient specifying the type of perturbation.

* * * * *

UNITED STATES PATENT AND TRADEMARK OFFICE
CERTIFICATE OF CORRECTION

PATENT NO. : 4,163,601

DATED : August 7, 1979

INVENTOR(S) : Robert Olshansky

It is certified that error appears in the above-identified patent and that said Letters Patent are hereby corrected as shown below:

Under Abstract, line 9, "high" should be -- higher --.

Column 1, line 45, "broadening improved" should be -- broadening is improved --.

Column 2, line 66, "band" should be -- bend --.

Column 3, line 25, "-L/2<2<L/2" should be -- L/2<Z<L/2 --.

Column 3, line 31, "f" should be -- f' --.

Column 3, line 51, "moles" should be -- modes --.

Column 4, line 20, "iwijz" should be -- $iw_{ij}z$ --.

Column 6, line 1, "w = 4π/L, 6π/L, 8π/L," should be -- w = 4π/L, 6π/L, 8π/L, .... --.

Column 6, lines 26 and 27, "f'" should be -- f" --.

UNITED STATES PATENT AND TRADEMARK OFFICE
CERTIFICATE OF CORRECTION

PATENT NO. : 4,163,601
DATED : August 7, 1979
INVENTOR(S) : Robert Olshansky

It is certified that error appears in the above-identified patent and that said Letters Patent are hereby corrected as shown below:

Column 6, line 37, "w = 4π/L, 8π/L, 12π/L" should be -- w = 4π/L, 8π/L, 12π/L.... --.

Column 6, line 54, "3,823,955" should be -- 3,823,995 --.

Column 7, line 37, "joints" should be -- joins --.

Column 8, line 27, "contents" should be -- constants --.

Signed and Sealed this

Third Day of June 1980

[SEAL]

Attest:

Attesting Officer

SIDNEY A. DIAMOND

Commissioner of Patents and Trademarks